Figure 1:
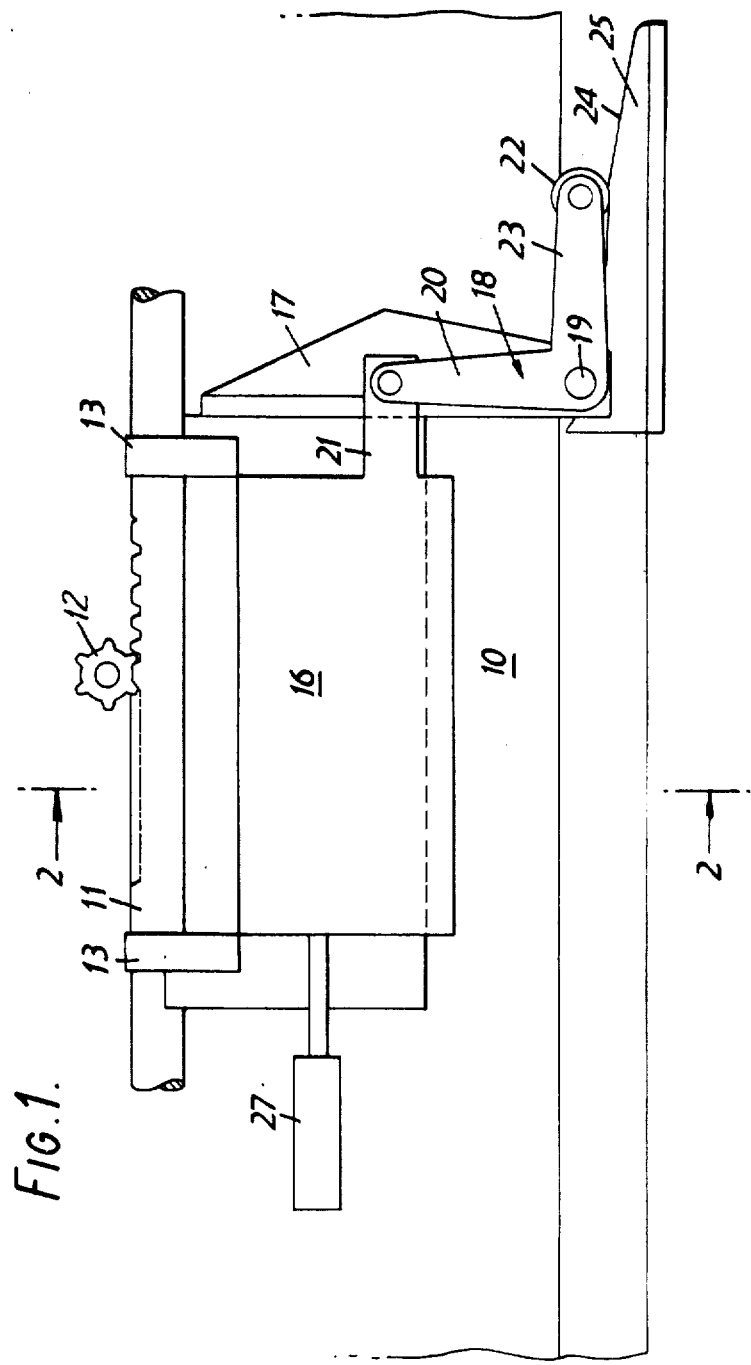

United States Patent

Baxter

[15] 3,687,006
[45] Aug. 29, 1972

[54] ATTACHMENT FOR CUTTING RACK GEAR TEETH OF VARIABLE PITCH

[72] Inventor: Michael David Baxter, Rochester, England

[73] Assignee: Hobourn-Eaton Manufacturing Company Limited, Rochester, England

[22] Filed: June 19, 1970

[21] Appl. No.: 47,785

[30] Foreign Application Priority Data

June 23, 1969    Great Britain..........31,682/69

[52] U.S. Cl.............................................90/7, 90/21
[51] Int. Cl. ............................B23f 1/06, B23f 23/00
[58] Field of Search..............................90/1, 2, 7, 21

[56] References Cited

UNITED STATES PATENTS

| | | | |
|---|---|---|---|
| 1,443,899 | 1/1923 | Kusold | 90/21 |
| 2,502,268 | 3/1950 | Moss | 82/14 |
| 1,330,949 | 2/1920 | Nadon | 90/7 |

*Primary Examiner*—Francis S. Husar
*Attorney*—Milton J. Wayne

[57] ABSTRACT

The specification describes an attachment for a rack cutting machine having a reciprocating rotary cutter for cutting the rack teeth, a holder for a workpiece on which the rack teeth are to be cut, and feed means for moving the cutter and the holder relative to each other in a direction lengthwise of the workpiece at a speed which bears a constant ratio to the speed of rotation of the cutter, which attachment comprises means for superimposing on this relative movement a secondary movement in said direction to displace the cutter and the holder from their relative positions determined by the feed means by a distance which varies in dependence on the instantaneous relative positions of the holder and workpiece in said direction. Instead of being in the form of an attachment, the components may be built into a rack cutting machine.

5 Claims, 2 Drawing Figures

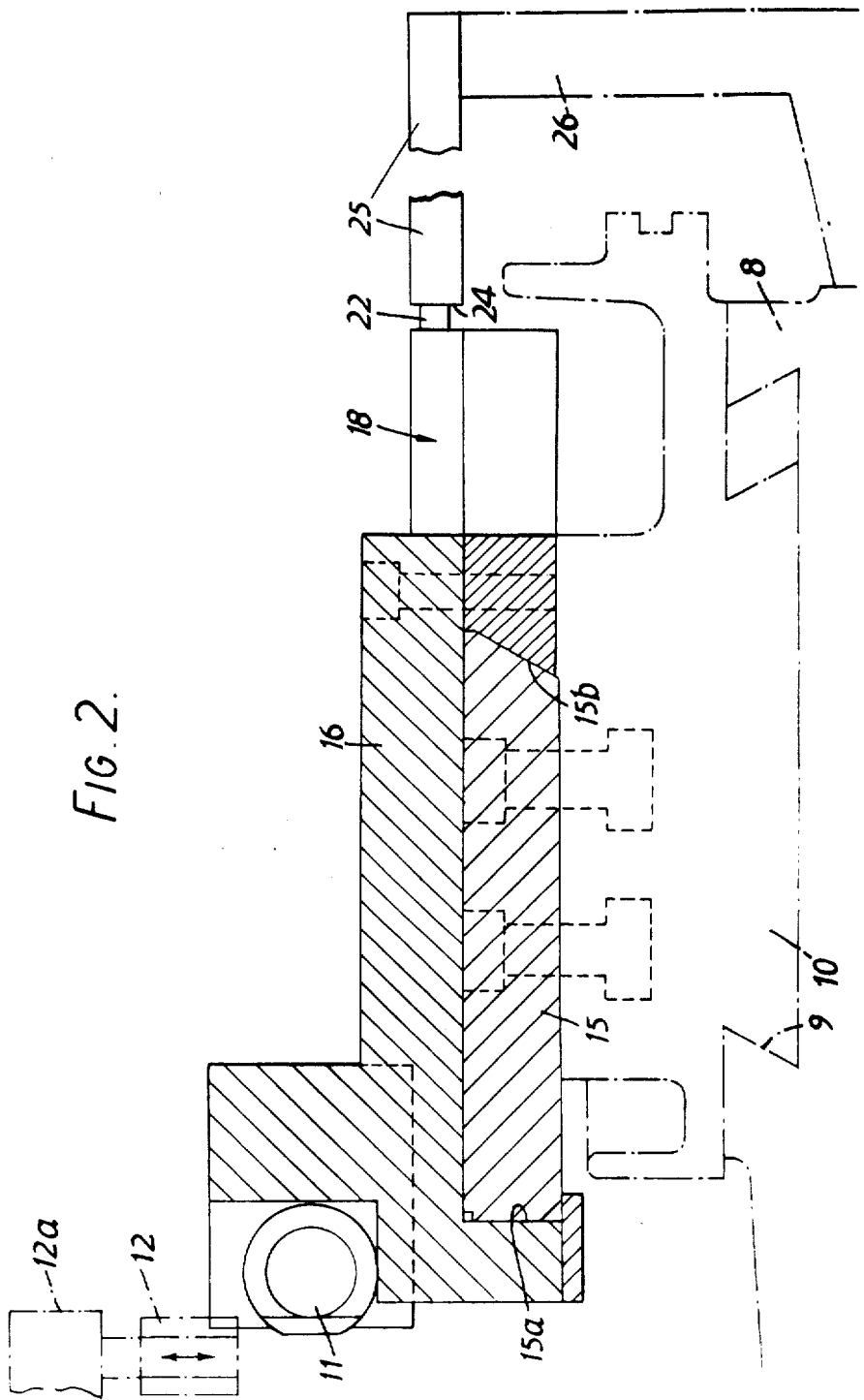

ATTACHMENT FOR CUTTING RACK GEAR TEETH OF VARIABLE PITCH

This invention relates to machine tools and more particularly to machines for cutting racks.

According to this invention there is provided an attachment for a rack cutting machine having a reciprocating rotary cutter for cutting the rack teeth, a holder for a workpiece on which the rack teeth are to be cut, and feed means for moving the cutter and the holder relative to each other in a direction lengthwise of the workpiece at a speed which bears a constant ratio to the speed of rotation of the cutter, which attachment comprises means for superimposing on this relative movement a secondary movement in said direction to displace the cutter and the holder from their relative positions determined by the feed means by a distance which varies in dependence on the instantaneous relative positions of the holder and workpiece in said direction.

For one construction of rack cutting machine in which the holder is mounted on a support which is moved past the cutter in a direction lengthwise of the rack at a uniform speed, the attachment comprises a table to be interposed between the holder and said support for movement relative to said support in said direction, said table being adapted to have the holder secured thereon, and cam means adapted to vary the position of the support relative to the table in said direction in dependence on the instantaneous relative portions of the cutter and the table in said direction.

The cam means may conveniently comprise a cam track extending in said direction and fixed in position with respect to the cutter in said direction, and a bell crank lever pivotally mounted on said support and having one arm held in following engagement with the cam track and its other arm coupled to said table.

The invention also provides a rack cutting machine comprising a reciprocating rotary cutter element, a holder element adapted to have mounted thereon a workpiece on which rack teeth are to be cut, a support on which one of said elements is mounted, means for imparting relative movement to the two elements in a direction lengthwise of the rack to be formed, the speed of said relative movement bearing a constant ratio to the speed of rotation of the cutter element, and means for varying the position of said one element relative to said support in said direction in dependence on the instantaneous relative position of said support and the other of said elements in said direction.

In one preferred construction according to the invention, a rack cutting machine comprises a reciprocating rotary cutter, a holder for a workpiece whereon rack teeth are to be cut by said cutter, a feed table, a traversing table mounted on the feed table for traversing movement in a direction lengthwise of the rack to be formed, the speed of which movement bears a constant ratio to the speed of rotation of the cutter, said holder being supported on the traversing table for movement in said direction relative to the traversing table, and cam means for varying the position of the holder in said direction relative to the traversing table in dependence on the instantaneous relative position of the feed table and the cutter in said direction.

Two embodiments of the invention will now be described by way of example with reference to the accompanying diagrammatic drawings in which:

FIG. 1 is a plan of an attachment according to the invention in position on a conventional rack cutting machine, and FIG. 2 is a sectional end elevation in the line 2—2 of FIG. 1.

A conventional rack cutting machine comprises a main traversing table 10 which is movable at a uniform speed along a slideway 9 formed in a feed table 8 by means of a feed screw (not shown) in a direction lengthwise of the workpiece 11 (i.e. lengthwise of the rack which is to be cut), and a reciprocating rotary cutter 12. The cutter is reciprocated axially of itself in known manner by a mechanism 12a and the workpiece 11 is, in the conventional machine, secured on the main traversing table 10 by means of clamps 13 constituting a holder. As the workpiece moves past the cutters, the mechanism 12a rotates the cutter in mesh with the teeth which it cuts by its reciprocating motion. The cutter thus rotates in timed relationship with the movement of the traversing table 10.

The attachment includes a member 15 which is rigidly secured to the traversing table 10 and opposite edges 15a, 15b of which provide guide surfaces by which a secondary table 16 is guided for movement lengthwise of the workpiece relative to the main traversing table 10. The clamps 13 holding the workpiece in position are secured to secondary table 16 instead of to the main traversing table 10.

A bracket 17 is secured to one end of the main traversing table 10 and a bell crank lever 18 which is mounted on a pivot 19 on the bracket has one arm 20 pivotally connected to a projection 21 on the secondary slide and has a roller 22 mounted on its other arm 23. Roller 22 engages a cam track 24 on a cam strip 25 secured to a bracket 26 mounted on the feed table 8 and is held resiliently in engagement with the cam track by an air spring or other resilient loading device 27 connected between the main and secondary tables.

As the main table 10 traverses the workpiece past the cutter, the engagement of the roller 22 with the cam track causes a movement of the secondary table 16 relative to the main table 10 in the lengthwise direction of the workpiece to be superimposed on the movement transmitted to table 16 by the main table under the control of the feed screw. The pitch of the rack teeth cut on the workpiece thus varies along its length and owing to the fact that the cutter is driven in timed relationship with the movement of the main slide and rotates in mesh with the rack teeth which it cuts, the rack teeth formed are of the correct shape, both theoretically and in practice, for proper mesh with a gear corresponding in shape to the cutter. In the instance shown the pitch of the rack teeth will increase progressively from the middle to each end of the rack, but by appropriately shaping the cam track the pitch of the rack teeth can be caused to vary in any desired way.

It will be clearly understood that although it is convenient to provide the invention in the form of an attachment for a conventional rack cutting machine, the invention can be applied by forming the slideway 15a, 15b for the secondary table directly on the main traversing table 10.

I claim:

1. An attachment for a rack cutting machine of the kind having a structure carrying a reciprocating rotary cutter for cutting rack teeth, a support member which is movable relative to the cutter in a direction lengthwise of the workpiece at a speed which bears a constant ratio to the speed of rotation of the cutter, and a holder for a workpiece on which the rack teeth are to be cut, said holder being supported by the support member, which attachment comprises a table adapted to be interposed between the holder and said support for movement relative to said support in said direction and to have the holder secured thereon, and cam and follower means adapted to be connected between the table and said structure and to vary the position of the support relative to the table in said direction in dependence on the instantaneous relative positions of said structure and the table in said direction.

2. An attachment as claimed in claim 1, wherein the cam means comprises a cam track extending in said direction and fixed in position with respect to said structure in said direction, and a bell crank lever pivotally mounted on said support and having one arm held in following engagement with the cam track and its other arm coupled to said table.

3. In a rack cutting machine of the kind having a reciprocating rotary cutter element, a holder element for a workpiece on which rack teeth are to be cut which elements are movable relative to each other in a direction lengthwise of the workpiece at a speed bearing a constant ratio to the speed of rotation of the cutter element, and a support on which one of said elements is mounted; means for varying the position of said one element relative to said support in said direction in dependence on the instantaneous relative position of said support and the other of said elements in said direction.

4. In a rack cutting machine of the kind having a reciprocating rotary cutter, a holder for a workpiece whereon rack teeth are to be cut by said cutter, a feed table, and a traversing table mounted on the feed table for traversing movement in a direction lengthwise of the rack to be formed, the speed of which movement bears a constant ratio to the speed of rotation of the cutter said holder being supported on the traversing table for movement in said direction relative to the traversing table; cam and follower members means one of which members is connected to the holder and the other of which members is connected to move with the traversing table for varying the position of the holder in said direction relative to the traversing table in dependence on the instantaneous relative position of the feed table and the cutter in said direction.

5. A mechanism as claimed in claim 4, wherein the cam member has a cam track extending in said direction and is fixed in position with respect to the cutter in said direction, and wherein there is provided a bell crank lever pivotally mounted on the traversing table and having one arm held in following engagement with the cam track and its other arm coupled to the support, said one arm constituting said follower member.

* * * * *